United States Patent [19]

Oslin et al.

[11] Patent Number: 4,817,582
[45] Date of Patent: Apr. 4, 1989

[54] GAS COMBINATION OVEN

[75] Inventors: G. Robert Oslin; Stewart C. Jepson, both of Chicago, Ill.

[73] Assignee: Delaware Capital Formation, Inc., Wilmington, Del.

[21] Appl. No.: 97,842

[22] Filed: Sep. 17, 1987

[51] Int. Cl.$^4$ ............................................. A21B 1/00
[52] U.S. Cl. ................................... 126/21 A; 126/20; 126/91 A; 126/273 R; 126/369; 99/474; 432/209
[58] Field of Search ................... 126/20, 19 R, 21 A, 126/39 R, 39 C, 39 D, 39 E, 39 F, 91 A, 273 R, 348, 369; 219/401; 99/474, 415, 418, 330, 359; 432/209; 34/197, 198; 122/17

[56] References Cited

U.S. PATENT DOCUMENTS

| | | | |
|---|---|---|---|
| 1,757,361 | 5/1930 | Engels | 126/21 A |
| 1,820,286 | 8/1931 | Miner, Jr. et al. | 126/368 |
| 1,845,581 | 2/1932 | Coakley | 122/17 |
| 2,039,429 | 5/1936 | Lydon | 432/209 |
| 2,041,930 | 5/1936 | Houlis | 126/91 A |
| 2,048,644 | 7/1936 | Winder et al. | 432/209 |
| 3,351,025 | 11/1967 | Tillander et al. | 126/21 |
| 3,744,474 | 7/1973 | Shaw | 126/20 |
| 4,029,463 | 6/1977 | Johansson et al. | 126/21 A |
| 4,426,923 | 1/1984 | Ohata | 219/401 |
| 4,506,598 | 3/1985 | Meister | 99/330 |
| 4,626,661 | 12/1986 | Henke | 219/400 |
| 4,626,662 | 12/1986 | Woolf | 219/501 |

FOREIGN PATENT DOCUMENTS

| | | |
|---|---|---|
| 173066 | 12/1984 | European Pat. Off. . |
| 8128536 | 2/1981 | Fed. Rep. of Germany . |
| 851062786 | 4/1981 | Fed. Rep. of Germany . |
| 3428648 | 7/1984 | Fed. Rep. of Germany . |
| 8422833 | 7/1984 | Fed. Rep. of Germany . |
| 8422834 | 7/1984 | Fed. Rep. of Germany . |
| 8423019 | 8/1984 | Fed. Rep. of Germany . |
| 3428792 | 8/1984 | Fed. Rep. of Germany . |
| 3518498 | 5/1985 | Fed. Rep. of Germany . |

Primary Examiner—Samuel Scott
Assistant Examiner—Noah Kamen
Attorney, Agent, or Firm—Welsh & Katz, Ltd.

[57] ABSTRACT

A gas-fired combination steam and dry oven has an oven cavity that is heated by heat exchange from one or more fire tubes and a boiler that is located outside the oven cavity and is heated by heat exchange from one or more other fire tubes. Both the oven and boiler fire tube heat exchangers employ natural draft gas burners. The combination oven can be operated as a forced-air convection oven, a forced-flow convection oven circulating superheated steam, or a steamer circulating saturated steam. Sensors in the oven supply information to a microprocessor that controls the gas burners to maintain an oven temperature within 5° F. or less. Sensors of the level of water in the boiler assure that the water level stays within predetermined limits. Tray stops keep foods and the trays containing them away from the walls of the oven to permit free circulation of air, saturated steam, or superheated steam. Sensors of water temperature in the boiler and of the circulating mixture of air and water vapor temperature in the oven chamber permit the control of relative humidity when the oven is used to proof dough or hold cooked food at a relatively low temperature. Control of the temperature of water in the boiler is aided by blowdown and replacement if the water temperature becomes too high.

17 Claims, 10 Drawing Sheets

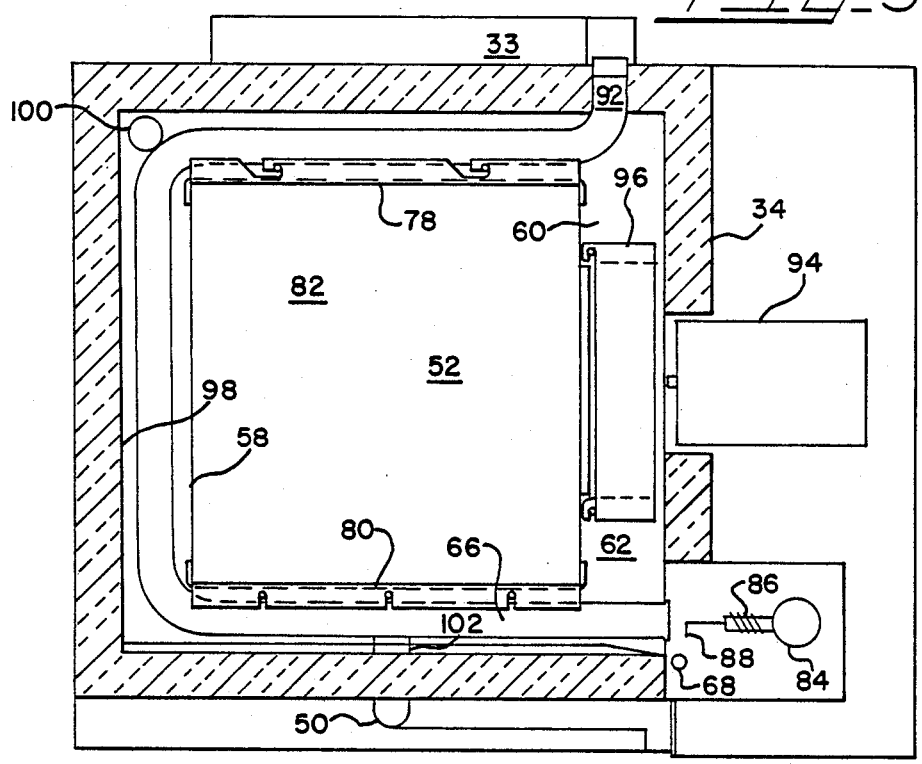
FIG_3_
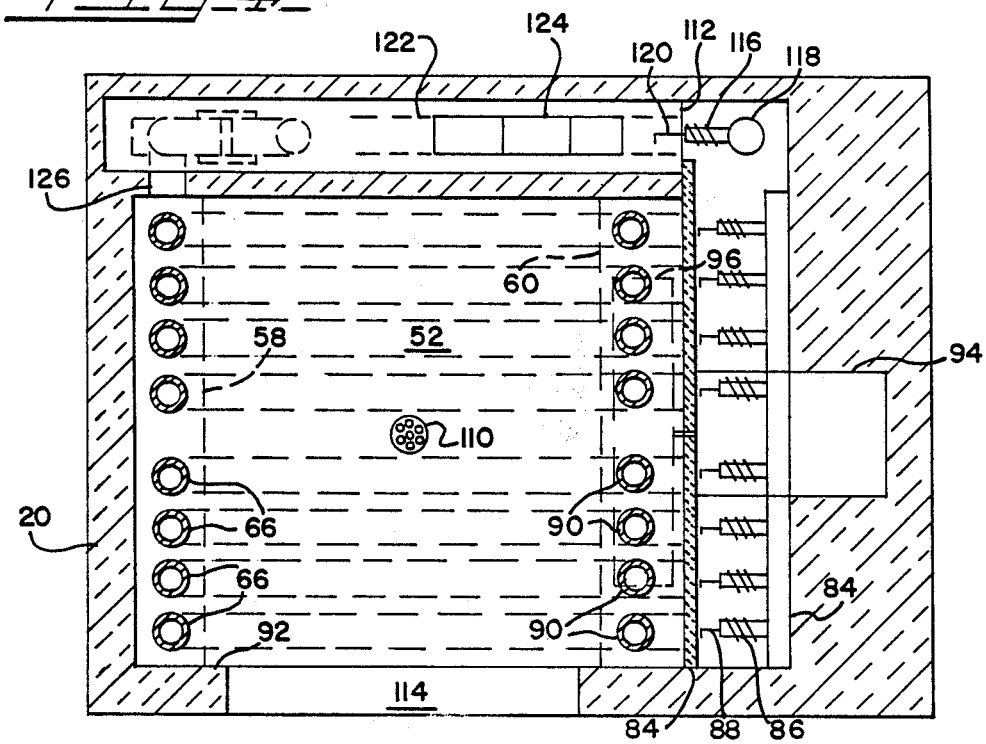
FIG_4_

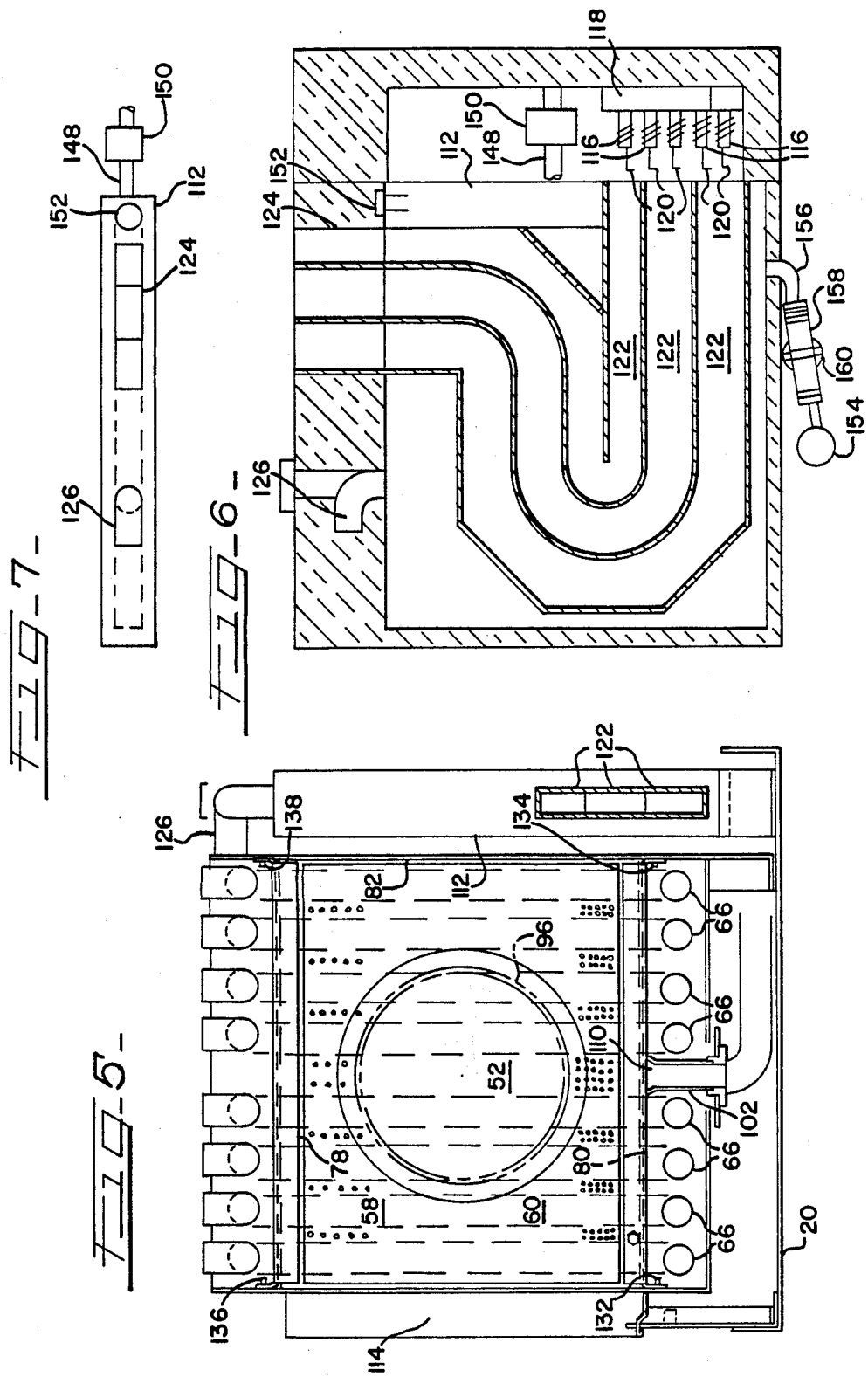

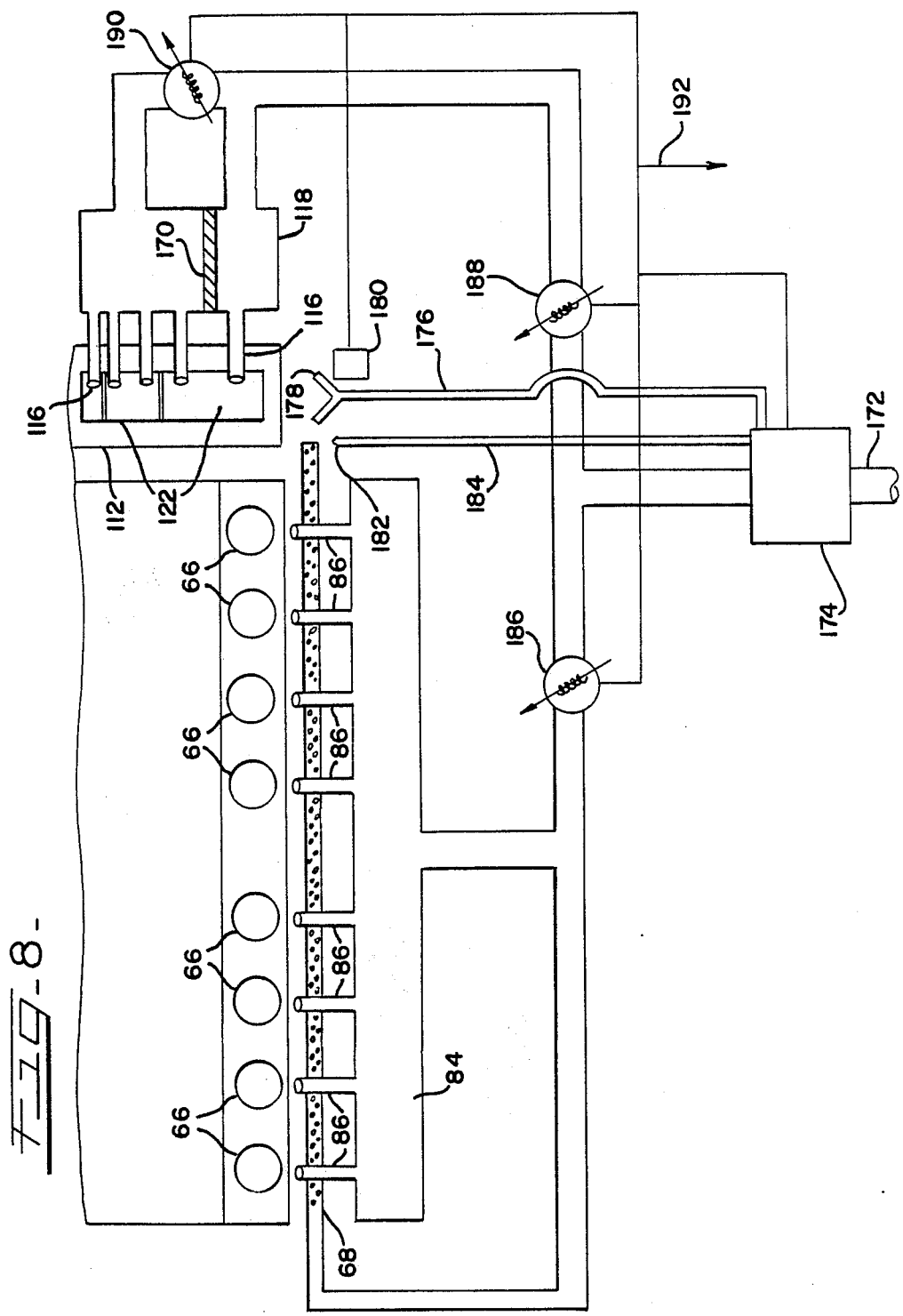

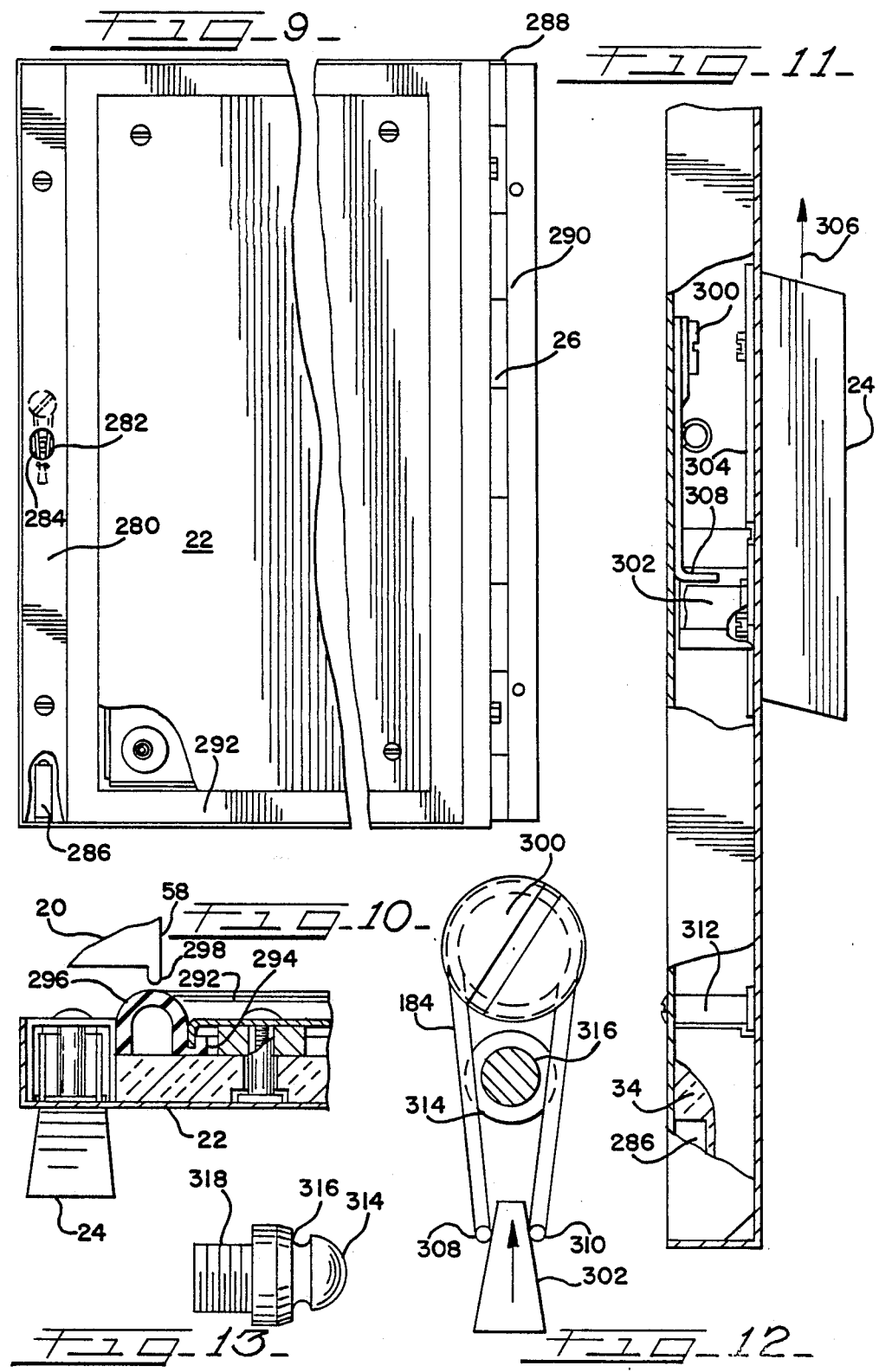

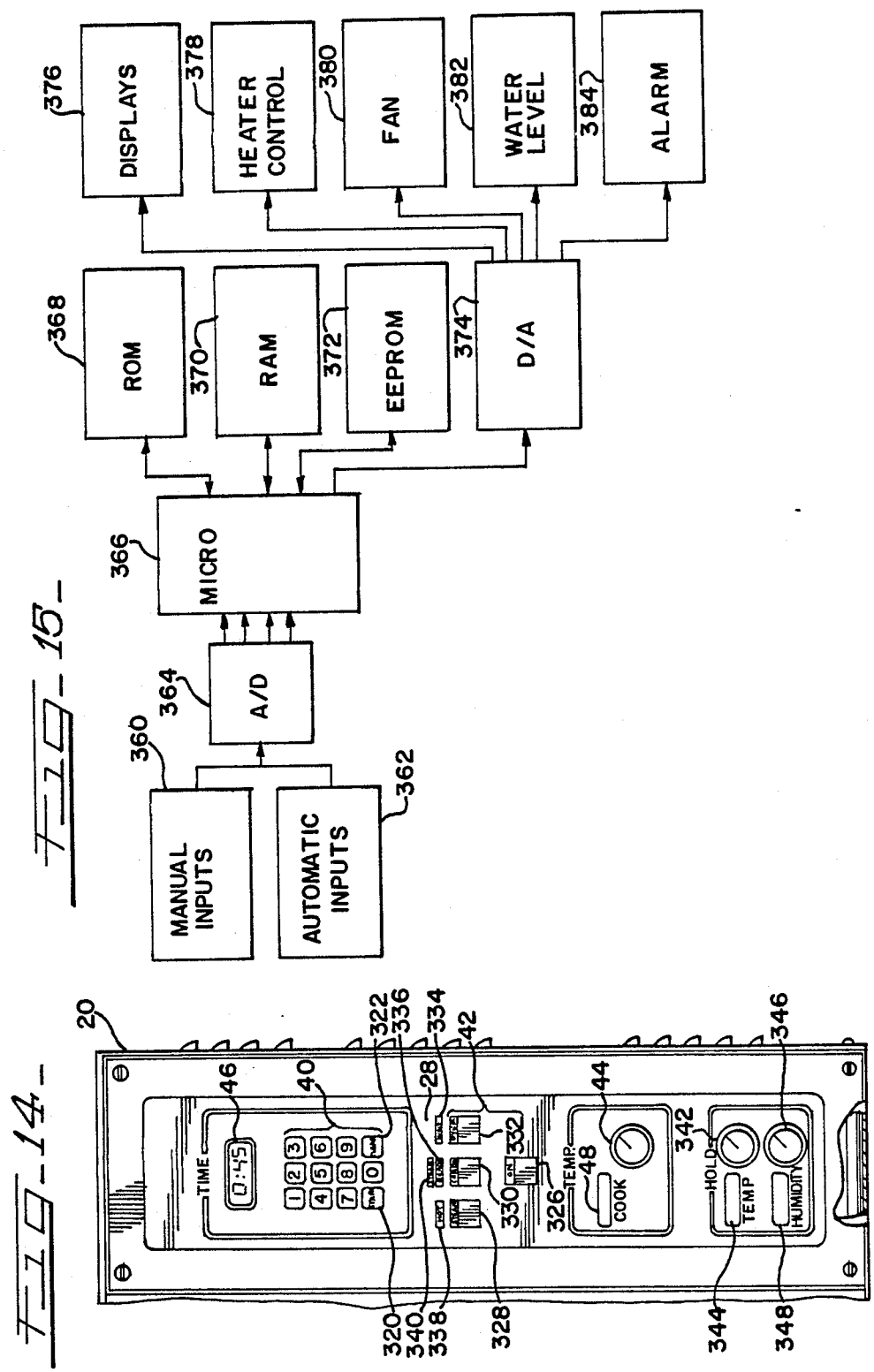

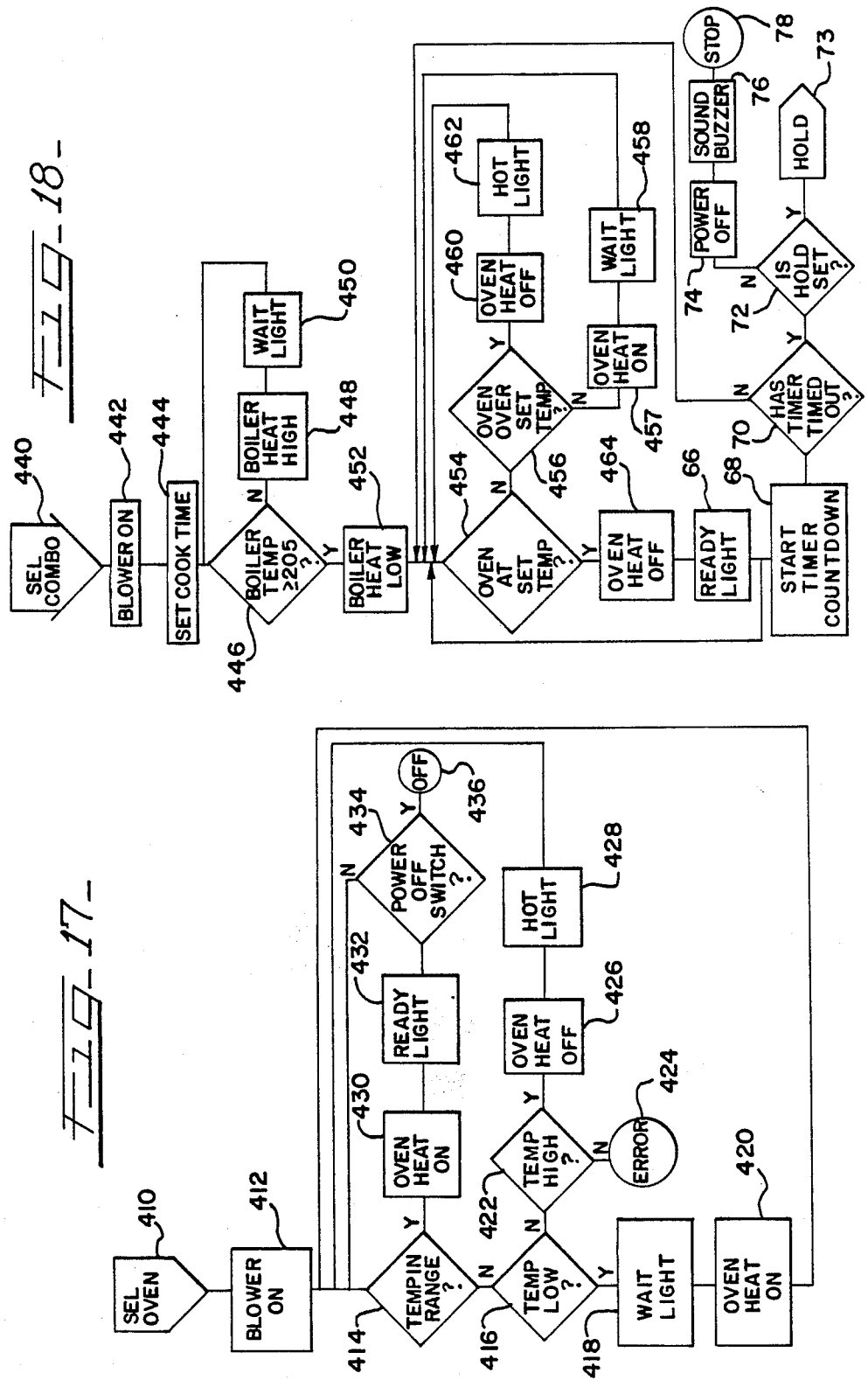

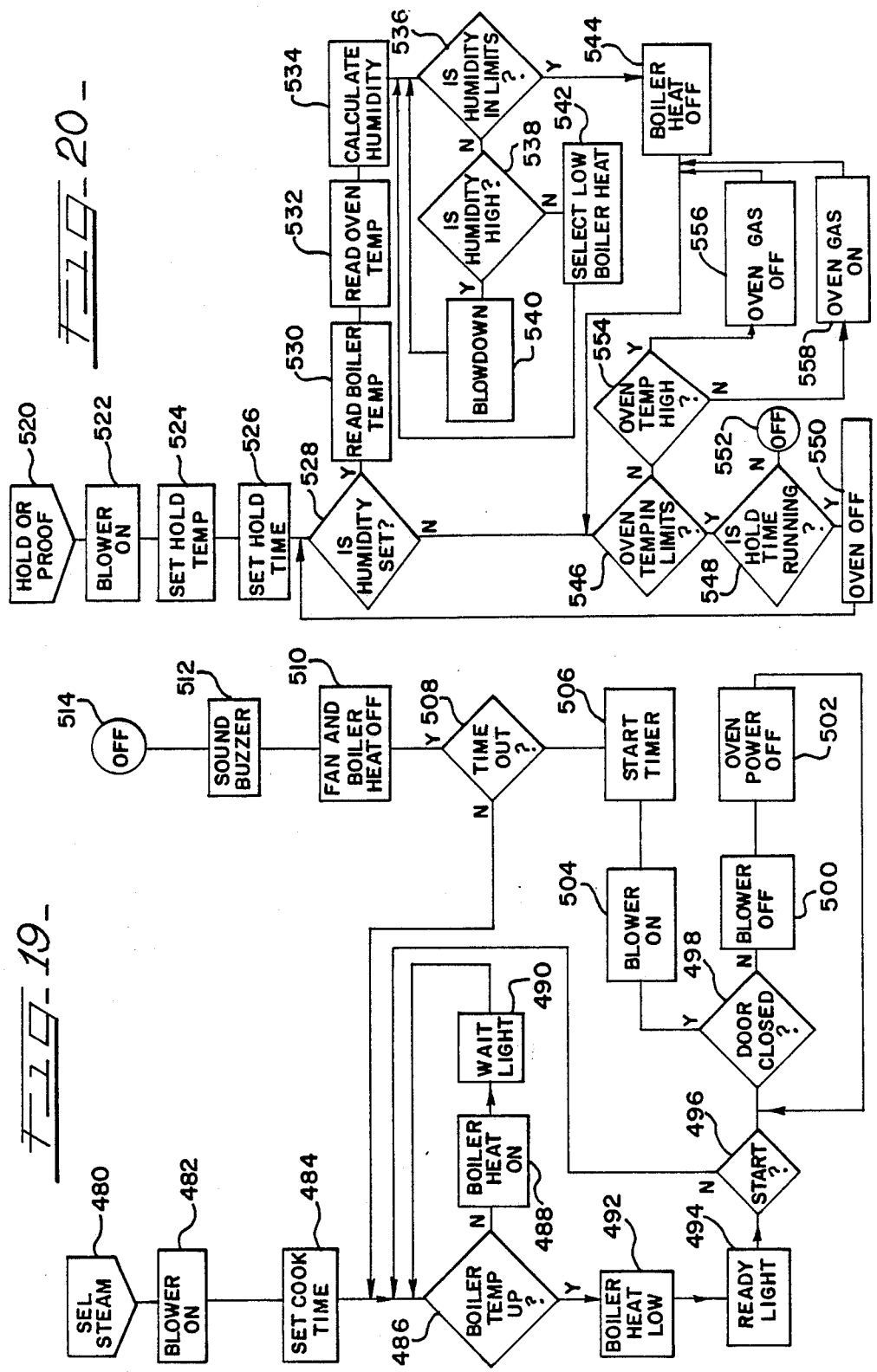

GAS COMBINATION OVEN

BACKGROUND OF THE INVENTION

This invention relates to cooking ovens. In particular, it relates to ovens for forced convection cooking with superheated steam, saturated steam, or heated air, all of which are heated by the combustion of gas.

The earliest gas-fired oven could be described as a cube within a cube. The inner and outer cubes shared a common front vertical face which contained a door for access to the inner cooking compartment. Gas is burned in the space between the bottoms of the inner and outer cubes. Combustion products transferred heat to the inner compartment in their upward travel between the sides and backs of the cubes, and were exhausted via natural draft through holes in the top of the outer cube. Objects to be cooked were placed in the inner cube. These simply designed ovens typically suffered from low efficiency of heat exchange, scorching of the food in the bottom of the cooking compartment directly above the burners, and severe temperature stratification in the air space within the cooking compartment.

In transferring heat from a heat source such as burning gas to a quiescent gaseous fluid medium such as air, and finally to an object for cooking, the free-convection coefficient for heat transfer from an air film to food is the main limit on the overall rate of heat transfer. By employing a fan to circulate the heated air within the cooking chamber, and hence transfer heat from the air to the food through forced convection, it was found that cooking speed could be significantly increased. Through air circulation, these so-called convection ovens also exhibited greatly improved temperature uniformity within the cooking compartment.

A subsequent modification to gas-fired convection ovens allowed the gas combustion products to pass through the cooking compartment and directly transfer heat to the food. The convection fan draws the flue gases through holes in the top of the cooking chamber, circulates them about the cooking chamber, and then exhausts the gases through other holes in the top of the oven. This essentially reduced the exit temperature of the flue gas to that of the oven cooking chamber, and thus increased the efficiency of heat exchange. In reference to the vertical standpipe through which flue gases were typically drawn from above the cooking compartment and down into the fan inlet, these modified gas convection ovens were called snorkel ovens.

Modern commercial gas ovens are designed either with and without convection fans, and either with and without passing flue gases through the cooking chamber. The principle of the gas snorkel convection oven, applied in various detailed spatial configurations, represents the current state of the art in commercial gas ovens.

The art of steam cooking was developed as an alternative to cooking food in a free- or forced-convection hot air environment. Surface heat transfer coefficients associated with condensing saturated steam are typically greater than those of circulating hot air. Foods cooked in steam cook more quickly, lose less moisture, keep their food values and look better. Conventional steamers surround food objects with a continuous supply of saturated steam. This is usually done at atmospheric pressure, but saturated steam at elevated temperatures can be obtained in a pressure cooker.

In atmospheric steamers, a condensate drain is placed in the bottom of the cooking compartment to remove liquid water which condenses on the compartment surfaces and on the food object and to carry away any entrained liquids originating from the food. With the exception of the condensate drain and the steam inlet port, the atmospheric steamer compartment represents a closed system. Unlike conventional dry convection ovens, a tight door seal is achieved with a gasket of silicone rubber or the like. By continuously supplying the compartment with steam at atmospheric pressure, all air is flushed from the compartment. Cooking takes place in an environment of saturated steam in the absence of dilution air. In an atmospheric convection steamer, the saturated steam is circulated within the compartment by a fan.

Atmospheric steamers can be either gas-fired or powered by electricity. To provide the required steam throughput, gas-fired steamers typically employ relatively large gas-fired tube boilers positioned beneath the steamer compartment. The large surface area for heat transfer between the fire tube and water and the resulting large volume of water required in a conventional gas-fired steam generator typically prevents the use of gas-fired steamers as integral counter-top units.

Extraordinary cooking performance beyond the capabilities of separate convection ovens or steamers has more recently resulted from combining the functions of an atmospheric steamer and a convection oven into a single unit. These versatile modern combination convection oven-steamers, or combination ovens, exhibit increased cooking speed at reduced oven temperature, reduced food moisture loss, browning capabilities of dry convection ovens, and the ability to control relative humidity as well as temperature within the cooking chamber. The combination cooking mode involves providing the oven cavity with a continuous supply of saturated steam at atmospheric pressure, and maintaining an environment of circulating superheated steam in the oven cavity by employing the normal oven heat source, thermostat, and convection fan. The combination oven can also function as a dry convection oven or an atmospheric convection steamer. As with the atmospheric steamers described earlier, combination ovens are equipped with a condensate drain and a tight door seal. Combination convection oven-steamers represent the current state of the art in commercial cooking and their broad potential for specific cooking applications has not yet been fully tapped.

Available evidence to date suggests that the widely heralded benefits of combination-mode cooking depend on the maintenance of a circulating superheated steam environment in the absence of dilution air. In transferring heat from condensing steam to a solid surface, it is well known that dilution air can form an insulating barrier on the surface of the solid object which inhibits heat transfer from the condensing steam. All or nearly all commercially feasible combination ovens are currently powered by electricity, and all combination ovens currently produced in the U.S. are exclusively electric powered. As with the atmospheric steamer described earlier, electric combination ovens can effectively prevent dilution air from contaminating the superheated steam oven. On the other hand, because the oven cavity more completely resembles a true open system, a conventional gas-fired snorkel convection oven cannot be directly applied to maintain a circulating environment of superheated steam in the absence of dilution air, even by incorporating a vent damper.

The major challenge in developing a successful gas-fired combination convection oven-steamer, then, is to design a gas-fired oven heat exchanger which is compact, efficient, reliable, cost-effective, and, most importantly, which can maintain a circulating environment of undiluted superheated steam with precise temperature control in space and time. A second challenge in developing an attractive gas-fired combination oven is to design a compact, efficient steam generator which is physically configured so as to allow counter-top implementation of the unit by eliminating the large space requirements associated with conventional gas-fired steam generators.

A further problem in cooking arises from the fact that cooking cycles sometimes require temperature changes. In such a case, it is necessary to have some means of storing a desired temperature control level for a particular time and a different temperature control level for a different period of time. Information such as this is best handled by a microprocessor with associated memories.

SUMMARY OF THE INVENTION

It is an object of the present invention to provide a better oven for cooking.

It is a further object of the present invention to provide a gas oven in which the combustion products of the gas do not enter the oven chamber.

It is a further object of the present invention to provide a gas convection oven in which the oven chamber is heated by heat exchange from a fire tube.

It is a further object of the present invention to provide a gas oven having a circulating superheated steam environment which excludes dilution air and gas combustion products.

It is a further object of the present invention to provide a gas oven in which air flow is circulated in a symmetrical pattern between an outer heat-exchange region and an inner cooking chamber.

It is a further object of the present invention to provide a gas oven in which the oven chamber is heated by heat exchange from a fire tube that operates with natural draft.

It is a further object of the present invention to provide a gas combination oven in which a water boiler is heated by heat exchange from a fire tube.

It is a further object of the present invention to provide a gas combination oven in which the boiler is heated by heat exchange from a fire tube that operates with natural draft.

It is a further object of the present invention to provide a gas combination oven including a convection oven that is heated indirectly from a fire tube and a steam boiler that is heated indirectly from another fire tube.

It is a further object of the present invention to provide a gas combination oven that cooks by forced circulation of superheated steam that is heated by heat exchange from a fire tube.

It is a further object of the present invention to provide a novel gas oven that cooks by forced circulation of air.

It is a further object of the present invention to provide a novel gas oven that cooks by forced circulation of superheated steam.

It is a further object of the present invention to provide a novel gas oven that functions as a steamer.

It is a further object of the present invention to provide a novel gas combination oven that cooks with dry air, superheated steam, or saturated steam.

It is a further object of the present invention to provide a novel gas oven with unidirectional flow of heated air or superheated steam over food that is being cooked.

It is a further object of the present invention to provide a means of directing the flow of heated air or superheated steam that results in uniform or specifically distributed flow.

It is a further object of the present invention to provide a novel gas combination steam oven, dry oven, and steamer that is controlled by a microprocessor.

It is a further object of the present invention to provide a novel gas oven with precise temperature control in time.

It is a further object of the present invention to provide a novel gas oven that provides precise temperature control in space.

It is a further object of the present invention to provide a novel gas oven with a seal that prevents the entry of air into the oven and the escape of steam from the oven below a certain pressure.

It is a further object of the present invention to provide a novel gas oven that can produce controlled temperatures and humidities.

Other objects will become apparent in the course of a detailed description of the invention.

A gas-fired combination steam and dry oven has an oven cavity that is heated by heat exchange from one or more fire tubes and a boiler that is located outside the oven cavity and is heated by heat exchange from one or more other fire tubes. Both the oven and boiler fire tube heat exchangers employ natural draft gas burners. The combination oven can be operated as a forced-air convection oven, a forced-flow convection oven circulating superheated steam, or a steamer circulating saturated steam. Because gas combustion products do not enter the oven cavity, objects can be cooked in circulating superheated steam in the absence of dilution air. Air or steam is circulated in a symmetrical pattern between the outer fire tube heat exchange region and the inner cooking chamber. Flow through the inner cooking chamber is unidirectional and can be measured and specifically distributed. Sensors in the oven supply information to a microprocessor that controls the gas burners to maintain an oven temperature within 5° F. or less. Sensors of the level of water in the boiler assure that the water level stays within predetermined limits. Tray stops keep foods and the trays containing them away from the walls of the oven to permit free circulation of air, saturated steam, or superheated steam. Sensors of water temperature in the boiler and of the circulating mixture of air and water vapor temperature in the oven chamber permit the control of relative humidity when the oven is used to proof dough or hold cooked food at a relatively low temperature. Control of the temperature of water in the boiler is aided by blow-down and replacement if the water temperature becomes too high. The boiler may be located behind the oven cavity, above it, below it, or at either side of the cavity. The oven may stand alone or it may be stacked as a combination of multiple units.

BRIEF DESCRIPTION OF THE DRAWINGS

FIG. 3 is a sectional front view of the combination oven of the present invention.

FIG. 4 is a sectional top view of the combination oven of the present invention.

FIG. 5 is a sectional side view of the combination oven of the present invention.

FIG. 6 is a sectional side view of the boiler of the combination oven.

FIG. 7 is a top view of the boiler of FIG. 6

FIG. 8 is a schematic view of the gas distribution arrangement for the combination oven.

FIG. 9 is a cut-away side view of the door of the combination oven of FIG. 1

FIG. 10 is a bottom view of the door of FIG. 9.

FIG. 11 is a cut-away side view of a portion of the oven door of FIG. 9.

FIG. 12 is a front view of the spring of FIG. 10.

FIG. 13 is a side view of a latching bullet.

FIG. 14 is an expanded view of the control panel of the combination oven of FIG. 1.

FIG. 15 is a functional block diagram of a circuit for controlling the combination oven of the present invention.

FIG. 17 is a flow chart of operation in the oven mode.

FIG. 18 is a flow chart of operation in the combination oven mode.

FIG. 19 is a flow chart of operation in the steam mode.

FIG. 20 is a flow chart of operation in the hold or proof mode.

DETAILED DESCRIPTION OF THE PREFERRED EMBODIMENT

Figure 1:
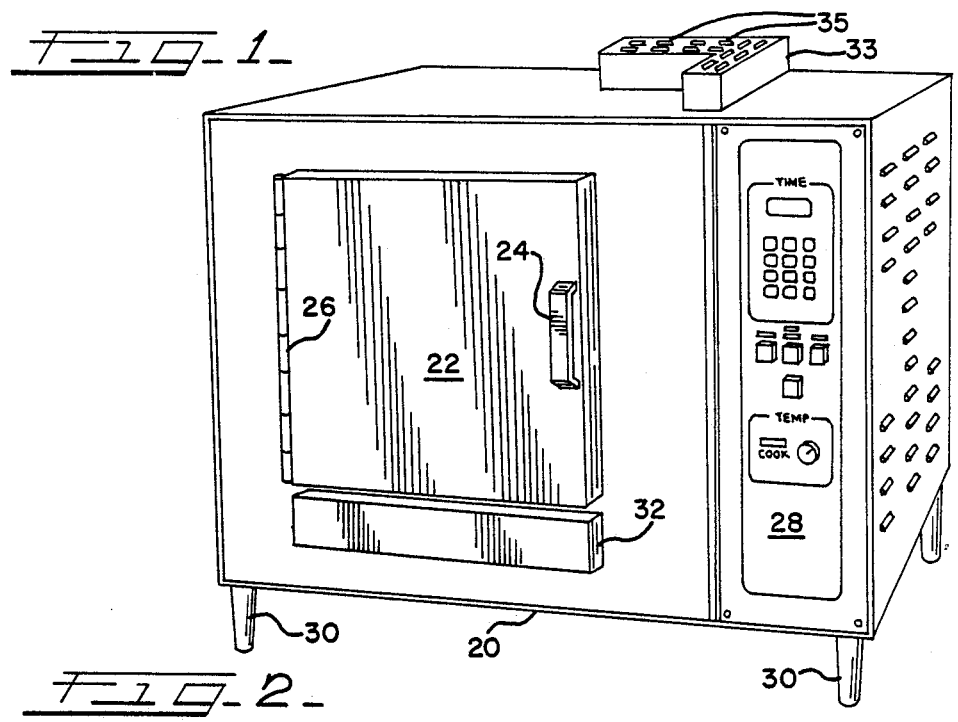
FIG. 1 is an isometric front view of the combination oven of the present invention.

FIG. 1 is an isometric front view of a combination oven 20 of the present invention. In FIG. 1, a door 22 is shown with a hinge 26 on the left and a handle 24 on the right. The door 22 can be reversed in the field to place the handle 24 on the left and the hinges 26 on the right as desired for use with various kitchen layouts. A control panel 28 includes controls and visual displays that will be described later in detail. Legs 30 are provided to allow the oven 20 to function as a self-standing unit, or the combination oven 20 may be used without legs. In addition, two combination ovens 20 can be stacked one above the other in a combined double unit. A drip pan 32 hangs below the door 22 to catch any drips that occur when the door 22 is opened. The drip pan 32 can be removed to be emptied. A flue cover 33 at the top of the oven 20 exhausts flue gases through expanded slots 35 that minimize the possibility that objects will be stacked to block the exhaust.

Figure 2:
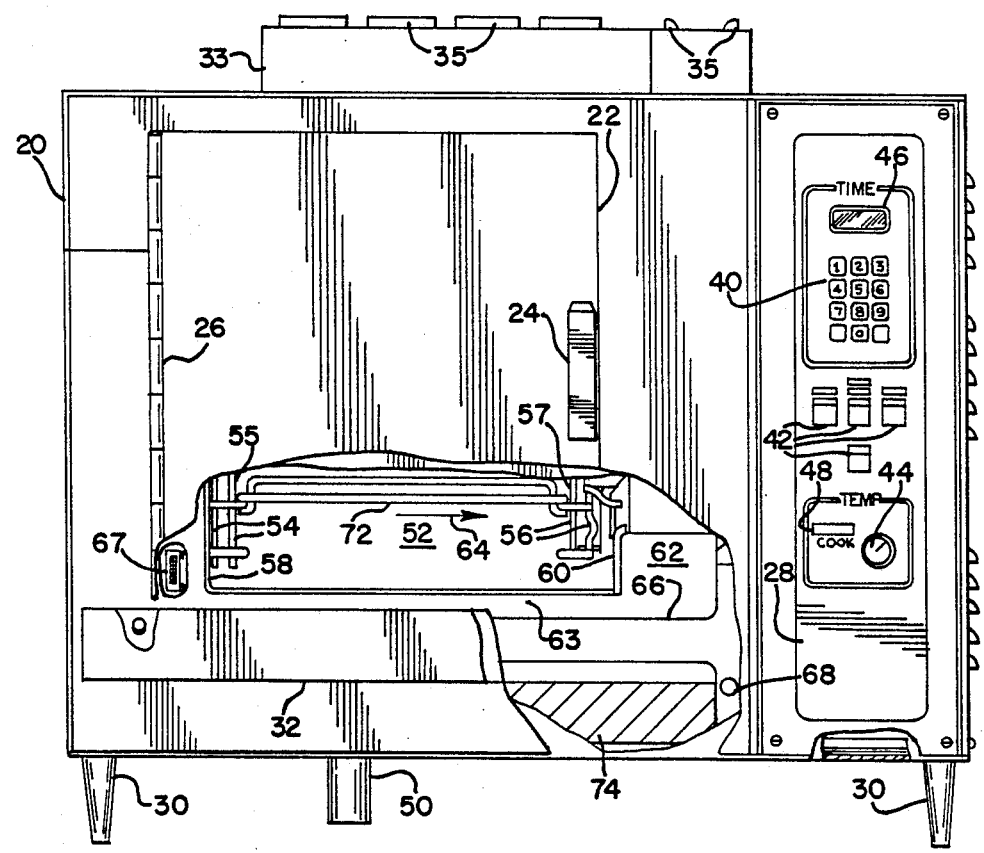
FIG. 2 is a partially cut-away front view of the combination oven of the present invention.

FIG. 2 is a partially cut-away front view of the combination oven 20 of the present invention. As in FIG. 1, the door 22 in FIG. 2 has the handle 24 at the right and the hinges 26 at the left. The control panel 28 includes a key pad 40, a number of push buttons 42 and a dial 44 that can be used to enter the desired cooking temperature and other control data. A display 46 shows cooking time, diagnostic information, and other information that can be programmed by the operator. A display 48 shows the temperature selected for cooking. The optional legs 30 are about four inches long, which provides clearance to clean under the combination oven 20. A drain 50 carries condensate, drain water from a boiler, and liquid wastes to the sewer.

An inner chamber 52 is the cooking space in the combination oven 20. The inner chamber 52 includes racks 54 and 56. The rack 54 is secured to a left chamber plate 58 of the oven chamber 52, and the rack 56 is secured to a shroud 60 which defines a wall of the inner chamber 52 and a plenum 62 that is part of an outer chamber 63. The left chamber plate 58 and the shroud 60 are shown in more detail in FIG. 3. The racks 54 and 56 include spacers 55 and 57, respectively. The spacers 55 and 57 project vertically to keep a shelf 72 away from the left chamber plate 58 and the shroud 60. This improves the circulation of air or steam in the inner chamber 52, which is blown by a fan 96 in the direction of an arrow 64. After passing through the shroud 60, the air or steam is blown past a fire tube 66 in the outer chamber 63 which supplies heat to the air or steam. FIG. 2 also shows a reed switch 67 which is disposed in the combination oven 20 so as to be concealed by the stainless-steel exterior of the combination oven 20. The door 22 includes a magnet (not shown here) to operate the reed switch 67 to provide an indication that the door 22 is closed or open. A second reed switch (not shown) is located in a corresponding position in the combination oven 20 on the right side of door 22. The one of the two reed switches that is on the side of the door handle 24 is used to signal closure of the door 22. The magnet operates the reed switch 67 or the other reed switch that is not shown through the non-magnetic stainless steel of the door 22 and the combination oven 20.

The fire tube 66 receives the heated combustion products of a burner that will be shown later. An igniter tube 68 serves as a lighter arm to ignite a mixture of air and gas to provide heat in the fire tube 66. Insulation 74 prevents escape of much of the heat in the fire tube 66 to the outside of the oven 20.

FIG. 3 is a sectional front view of the oven of the present invention. In FIG. 3, the inner chamber 52 is in the form of a rectangular parallelepiped defined by the left chamber plate 58, the shroud 60, a top plate 78, bottom plate 80, a back wall 82, and the door 22 of FIG. 2. The left chamber plate 58, the shroud 60, the top plate 78 and the bottom plate 80 are all hung on pins for ready removal. This both makes it easier to clean the components and also exposes all of the fire tubes 66 so that the outer chamber 63, which includes the plenum 62 and the space around the fire tubes 66, can be cleaned. The outer chamber 63 thus encloses a volume defined by the outside of the left chamber plate 58, the shroud 60, the top plate 78, the bottom plate 80, the back wall 82, and a front wall 92 (shown in FIG. 4).

The fire tubes 66 are heated by burning gas that is supplied from a manifold 84. A burner 86 supplies a mixture of gas and air which is ignited by flames from the igniter tube 68. A flame spreader 88 is attached to the burner 86 to enhance mixing of the gases and promote complete combustion. The burner 86 and flame spreader 88 shown here were designed for use with natural gas. These designs could vary if different gases were used. The combustion products pass through the fire tube 66 to a flue 92 where they are discharged into the room through the flue cover 33. The natural draft of the fire tubes 66 and the flue 92 maintains combustion at the burner 86 without the need for a forced draft.

Although in the preferred embodiment, empty (finless) tubes are employed, alternatively, fins could be attached to either the inside and/or the outside of the oven fire tubes to further enhance heat transfer. A motor 94 drives a fan 96 that draws air or steam from the inner chamber 52 through the shroud 60. Air is then forced along the fire tubes 66 below the bottom plate 80, forming a concurrent-flow heat exchanger. Air is also forced along the fire tubes 66 above the top plate 78, forming a counterflow heat exchanger. The heated air or steam or both converges to the left of the left chamber plate 58 which is perforated to produce apertures that provide flow into the oven chamber 52. Air or steam flows through the apertures in the perforated plate and across the oven chamber from left to right. The perforations may be patterned to shield the oven contents from heating by radiation from the fire tubes 66. The perforations can be specifically sized and arranged to produce the most desirable air flow or temperature distribution within the oven chamber, from top to bottom, from front to back, or both. The insulation 34 surrounds the outer wall 98 of the outer chamber 63, the back wall 82, and the front wall 92 (shown in FIG. 4). A boiler inlet 100 admits steam from a boiler into the stream of heated air or steam above the top plate 78. The drain 50 is connected to a standpipe 102 that is open to allow drainage of any condensate or other liquid accumulation in the outer chamber 63 below the bottom plate 80 and the fire tube 66. The standpipe 102 is connected to an opening in the bottom plate 80 to drain the inner chamber 52. In the alternative, the drain 50 may simply be open to receive liquid matter from the inner chamber 52 without a standpipe 102.

FIG. 4 is a sectional top view of a portion of the oven 20 of the present invention. In FIG. 4, the manifold 84 is seen to be connected to a plurality of burners 86, each of which is associated with a fire tube 66 and a flue 90. The motor 94 is located behind the shroud 60 and the left chamber plate 58 is parallel to the vertical portions of the fire tubes 66. A drain hole 110 is connected to the standpipe 102 of FIG. 3 to drain the inner chamber 52. A boiler 112 is disposed behind the back wall 82, opposite the door opening 114. The boiler 112 is heated by a plurality of vertically stacked burners 116, only one of which is visible in FIG. 4. The burner 116 is connected to a boiler manifold 118 and includes a flame spreader 120 that directs the combustion products from the burner 116 into one of a plurality of fire tube channels 122 that terminate in a flue 124. Passage of the heated combustion products from the burner 116 through the fire tube channels 122 heats water in the boiler 112 to generate steam that is connected through a steam line 126 to supply steam to the inner chamber 52. The fire tube channels 122 comprise a double-pass fire tube. The steam line 126 is brought into the outer chamber 63 behind the left chamber plate 58 rather than directly into the inner chamber 52 so that if the boiler 112 is accidentally overfilled, the excess water will drop to the base of the oven and drain through standpipe 102 without contacting food in the inner chamber 52 or directly into the drain 50. Alternatively, the steam generating boiler and oven could be piped together at both the left and right ends to promote flow of the air or steam or mixture of air and steam across the boiler water surface from the high-pressure side in the plenum 62 to the low-pressure side in the outer chamber 63. A boiler 112 in FIG. 4 is shown behind the inner chamber 52 with its narrow dimension shown here as horizontal. The boiler 112 could equally as well have been placed at the sides of the oven 20, on top of, or underneath the oven 20. Placement of the boiler 112 behind the inner chamber 52 with its narrow dimension horizontal minimizes the width of the oven 20 and this location and the use of a plurality of fire tube channels 122 allows the burners 116 to be started vertically. This permits the combination oven and steamer to be a gas-fired counter-top unit, in contrast to the gas-fired steamers described above which require floor space.

FIG. 5 is a sectional side view of the oven 20 of FIG. 1 from behind the shroud 60 and the fan 96, looking toward the left chamber plate 58. FIG. 5 shows that in the preferred embodiment of the invention there were eight fire tubes 66 that were used to heat air or circulating steam in the outer chamber 63 and thus the inner chamber 52. The drain hole 110 is in the bottom plate 80 of the inner chamber 52 which is supported by pins 132 and 134. The top plate 78 is similarly suspended from pins 136 and 138, each representing a plurality of pins as needed to support the top plate 78. The steam line 126 carries steam from the boiler 112 into the inner chamber 52. This steam is heated by the passage of burned gas through the fire tube channels 122. A tee in the line 126 may be used to introduce cleaning compounds into the boiler 112, or an alternative opening may be provided for such compounds. In the preferred embodiment of the invention, the lower fire tube channel 122 were each heated by two burners and the upper fire tube channels 122 was heated by one burner. For this preferred embodiment of the invention, in a "steamer" mode of operation, all five burners 116 are fired, where in the "combination" mode of operation, only the bottom burner 116 is fired.

FIG. 6 is a sectional side view of the boiler 112 of the present invention, and FIG. 7 is a top view of the boiler 112. In FIGS. 6 and 7, the fire tube channels 122 follow a serpentine path from the burners 116 to the flue 124. The baffle strips Which divide the double-pass rectangular fire tube into three channels 122 distribute the flue gases evenly and allow the use of space-saving vertically-stacked natural-draft atmospheric burners. Water for making steam is introduced into the boiler 112 through an inlet line 148 under the control of a solenoid valve 150. The solenoid valve 150 is operated in response to inputs based on the mode of operation that is selected and the water level as detected by a sensor 152. The drain line 154 that drains the inner chamber 52 and the outer chamber 63 of FIG. 2 is also used to drain the boiler 112 through a drain connection 156. A section of flexible tubing 158 is placed between the drain 154 and the drain connection 156, and a pinch valve 160 is operated to pinch the flexible tubing 158 to hold water, or to release so as to drain the boiler 112. Steam from the boiler 112 enters the steam line 126 as described above with respect to FIG. 4.

FIG. 8 is a schematic view of the gas distribution arrangement of the oven 20. In FIG. 8, the burners 86 are shown symbolically in their connection to the manifold 84 and their proximity to the fire tubes 66. A portion of the boiler 112 is shown together with the burners 116 that heat the fire tubes 122. The manifold 118 has an internal separator 170. Operation of the circuit of FIG. 8 is as follows. A gas supply line 172 is connected to a gas control valve 174. A manually operable safety shut-off valve is built into the gas control valve 174, or could be placed immediately ahead of or behind the control valve 174. A line 176 from the control valve 174 supplies gas to a pilot light 178 which is ignited by an igniter 180. This may be a spark igniter, a glow plug or any other convenient device for igniting the pilot light 178. In the alternative, the pilot light 178 may remain lit continuously, in which case the igniter 180, which is operated intermittently, is not needed.

A sensor bulb 182 is heated by the pilot light 178 to supply an indication on a line 184 to the control valve 174 that the pilot light 178 is lit. When the pilot light 178 is thus proved, the gas control valve 174 will supply gas to the downstream solenoid valves 186 and 188. The gas control valve 174 also contains a pressure regulator, which could alternatively be placed immediately ahead of or behind the control valve 174. A pressure regulator could be placed immediately ahead of or behind the solenoid valves 186 and 188 to allow operation of the oven and boiler at different manifold pressures. If after the pilot is proved, the gas control valve 174 that cuts off gas to the pilot sensing bulb fails to sense a pilot flame, the main gas control valve 174 is closed and the pilot lighting sequence is repeated.

If the oven is to be heated, a solenoid valve 186 is operated to admit gas to the manifold 84 and the igniter tube 68. The igniter tube 68 is ignited from the pilot light 178 and flame from the igniter tube 68 then ignites each of the burners 86 which are supplied with gas from the manifold 84 under the control of the solenoid valve 186. If the boiler 112 is to be heated, a solenoid valve 188 is operated to supply gas to the manifold 118, supplying gas to the bottom one of the burners 116. If in addition, a solenoid valve 190 is operated, then all five of the burners 116 will receive gas from the line 172 and will be ignited by the flame from the pilot light 178. Alternatively, two or more firing rates to the boiler could be accomplished by gas flow modulation, either through additional pressure regulation or by means of a rate-limiting orifice. Another method of controlling the heating rate is preprogrammed cycling of all five boiler burners.

Operation of the igniter 180, the gas control valve 174, and the solenoid valves 186, 188 and 190 is controlled by electrical signals on control line 192. The normal mode of controlling the temperature of the heated air or steam in the oven chamber 52 of FIG. 2 is by operating either all of the burners 86 or none. If desired, different ones of the burners 66 could be operated by partitioning the manifold 84 in the same way that the manifold 118 was partitioned, or by providing separate manifolds. An alternate gas distribution system could employ two gas control valves 174, two pilot lights and flame sensors and essentially treat the oven and boiler as two separate appliances. Alternatively, oven temperature could be controlled by modulating the gas input rate through burners 86. This could be accomplished by providing gas to the manifold 84 through a fixed bypass or a continuously adjustable rate-limiting orifice, or by providing two or more desired gas pressure levels in manifold 84.

FIG. 9 is a cut-away side view of the door 22 of FIG. 1 from inside the combination oven 20 of FIG. 1, and FIG. 10 is a partial sectional bottom view of the door 22 of FIG. 9. In FIG. 9, a channel 280 covers an opening 282 which exposes a portion of a spring 284. The channel 280 also covers a magnet 286, which operates a reed switch to indicate that the door is open.

As shown in FIG. 9, the channel 280 is on the left and the hinge 26 is on the right. Reversal of the door is effected by removing a hinge pin 288, a hinge plate 290 and the channel 280, to which the spring 284 is attached. The magnet 286 is held in place by the channel 280. A hinge plate 290 is installed on the left side of the oven. The plate 280 is turned upside down from its position in FIG. 9, placing the magnet 286 at the top in FIG. 9, and the door 22 is rotated 180° to place the hinge 26 on the left, the plate 280 on the right, and the magnet 286 at the bottom on the right. The hinge pin 288 is then inserted from the top. The handle 24 is also turned upside down.

A gasket 292, located around the edge of the door 22 as shown, is made of a resilient material, such as silicone rubber or the like, that will withstand oven temperatures and still seal the oven by coming into engagement with the edges of oven chamber 52 of FIG. 2. In FIG. 10, the gasket 292 is seen to have a U-shaped form with a tab 294 that holds the gasket 292 in place. A contact region 296 is molded so as to be thinner in cross-section than the rest of the gasket 292. This facilitates bending of the gasket about a rounded lip 298, which protrudes from the combination oven 20 to make a seal with the gasket 292. The rounded lip 298 is thinner than the width of the gasket 292, so that when the door 22 is closed, a portion of the gasket 292 is wrapped partly around the rounded lip 298, making a seal. This keeps air out of the oven chamber 52 and keeps steam in. However, any buildup of pressure in the oven chamber 52 above a predetermined amount is readily vented as the gasket 292 yields. The left chamber plate 58 is identified for reference, but rounded lip 298 is disposed in a substantially rectangular pattern as seen from the front of the combination oven 20 to engage the gasket 292 and make a seal. The shape of the gasket 292, as shown in cross-section in FIG. 6, makes it possible to form the gasket 292 as a single molding without the need to use re-entrant mold parts. This is in contrast to the typical gasket which is molded as tubing and is cut and joined at the corners. The joint, made by vulcanizing or the like, tends to change the characteristics of such gaskets and make them more difficult to seal. The single-piece molded gasket 292 is free of such joints, which contributes to a more effective oven seal. Replacement of the gasket 292 and cleaning of the door 22 are both facilitated by removal of the hinge pin 288, which allows the door 22 to be removed from the combination oven 20.

FIG. 11 is a cut-away side view of a portion of the door 22, FIG. 12 is a front view showing the spring 284 of FIG. 11, and FIG. 13 is a side view of a latching bullet 314. In FIGS. 11, 12 and 13, a screw 300 is attached to the door 22 to secure the spring 284 to a sliding plate 304 in the door 22 while permitting rotation of the spring 284 about the center of the screw 300. The plate 304 is also free to pivot about a screw 305. This rotation of the spring 284 allows the spring 284 to make up for considerable amounts of misalignment of the door with respect to the latching bullet 314 that is attached to the combination oven 20 to secure the door 22. The handle 24 is attached to a cam 302 and to the sliding plate 304, which permits relative motion of the handle 24 and the cam 302 with respect to the door 22. Thus, when the handle 24 is moved in the direction of an arrow 306, the cam 302 is forced between prongs 308 and 310 of the spring 284. This spreads the spring 284 to release the door. The insulation 34 in the door 22 is placed throughout the interior of the door 22 except in a region occupied by the spring 284 and the cam 302. Structural support and separation of parts of the door 22 is maintained by a plurality of spacers 312 and by the insulation 34, a structurally rigid piece of insulation board.

FIG. 13 shows the bullet 214 which is fixed in place on the front of the oven 20 to engage the spring 284. A groove 316 in the bullet 314 engages the spring 284, which is spread by the cam 302 to release the spring 284 from the grooves 316 when the handle 24 of FIG. 11 is lifted. Threads 318 of the bullet 314 are used to secure the bullet 314 to the front of the combination oven 20. If the door 22 is changed to open in a different direction, the bullet 314 will have to be moved to engage the spring 284 on a different side. A mounting hole for the side of the door that is not used is covered by the hinge plate 290 of FIG. 9.

FIG. 14 is an expanded view of the control panel 28 of FIG. 1. In FIG. 14, the key pad 40 comprises a complete set of numbers and also a start button 320 and a clear button 322. The time display 46 displays hours and minutes, with the hours separated by a colon that flashes once per second to indicate that the timer is operating. The display on the time display 46 is cleared either by timing out or by the use of the clear button 322. Normal operation of the oven will comprise entering a desired cooking time by the use of the numerical keys of the key pad 40 after the combination oven 20 has reached a preset cooking temperature and displayed a "ready" light. Use then of the start button 320 begins a countdown so that a time display 324 shows remaining time to cook. It is also possible to use the time display 324 to display elapsed time.

A set of push buttons 42 provides for the selection of a mode and for turning the combination oven 20 on and off. Thus, the push buttons 42 include an on-off switch 326 and a steam select button 328, a combo select button 330 and an oven select button 332. If only the on-off switch 326 is operated, the oven 20 is said to be in no-mode. In no-mode, the pilot light 178 is lighted; it stays lit until the on-off switch 326 is operated again to turn the oven off. Alternatively, the pilot light could remain lit continuously whether the combination oven is on or off, or the pilot light could ignite intermittently with each call for heat from either the oven or the boiler burners. When a temperature and mode are selected and the cold combination oven 20 is turned on by the use of the push buttons 42, a wait light 334 will normally indicate that the combination oven 20 is heating to the desired temperature. A ready light 336 will then light to indicate that the desired temperature has been reached. A hot light 338 will normally provide an indication only when the selected temperature has been changed to a lower value for an oven that is already hot. That temperature is selected by turning the dial 44 to select the temperature that appears in the display 48. A service light 340 provides an indication that a diagnostic program has detected one or more malfunctions in the operation of the oven.

FIG. 14 also shows controls for features that are optional, but that add greatly to the versatility of the combination oven 20. A hold temperature dial 342 allows the selection of a holding or proofing temperature that is displayed in a display 344. A humidity dial 346 allows the selection of a humidity range that is displayed on a display 348. The temperature and humidity selected by the dials 342 and 346 are useful in two situations. First, temperature and humidity may be set by the dials 342 and 346, respectively, and a time, a temperature and a cooking mode may be selected by the key pad 40, the dial 44, and one of the select buttons 328, 330 or 332. When this happens, the combination oven 20 will perform as selected to cook food until the time displayed on the time display 46 counts down to zero. The oven 20 will then hold food at a temperature and humidity selected by the dials 342 and 346. This temperature is typically lower than the cooking temperature, to keep cooked food ready to serve. A second mode of operation is use of the oven to proof dough. This is allowing dough to rise under conditions of controlled temperature and humidity. To proof, the desired temperature and humidity are selected on the dials 342 and 346, and the start button 320 is pressed. This operates the oven at the selected temperature and humidity without first going through a cooking stage. In either case, the humidity is controlled by use of measurements of temperature of boiler water and circulating air. These are analogous to a wet- and dry-bulb measurement of temperature, which is a well-known way of determining relative humidity. For any given temperature of the circulating air as set on the display 344 by the dial 342, a particular value of relative humidity will correspond to a particular temperature of boiler water. These values are readily stored as a look-up table in ROM.

FIG. 15 is a functional block diagram of a circuit for controlling the oven 20 of the present invention. In FIG. 15, manual inputs 360 and automatic inputs 362 represent respectively the setting of switches, knobs, and the like, and the generation of inputs from sensors and automatically operated switches. Both outputs are taken to a multiplexing analog-to-digital (A/D) converter 364, which generates data inputs to a microcomputer 366. The microcomputer 366 is served by a read-only memory (ROM) 368, which stores an operating program for the microcomputer 366. A random-access memory (RAM) 370 provides volatile memory for the microcomputer 366, and an electrically erasable programmable read-only memory (EEPROM) 372 supplies nonvolatile memory for such functions as repeating the last previous cooking cycle. This enable a chef, for example, to enter a cooking time that is stored so that when he wishes to repeat the same cooking cycle, he need only load the oven, close the door, and press the start button. Outputs from the microcomputer 366 are taken to a digital-to-analog (D/A) converter 374 where they provide signals that are taken to control displays 376, a heater control 378, a fan control 380, a water-level control 382, and an alarm 384. Details of operation of control systems will be disclosed in the flow charts that follow.

Figure 16:
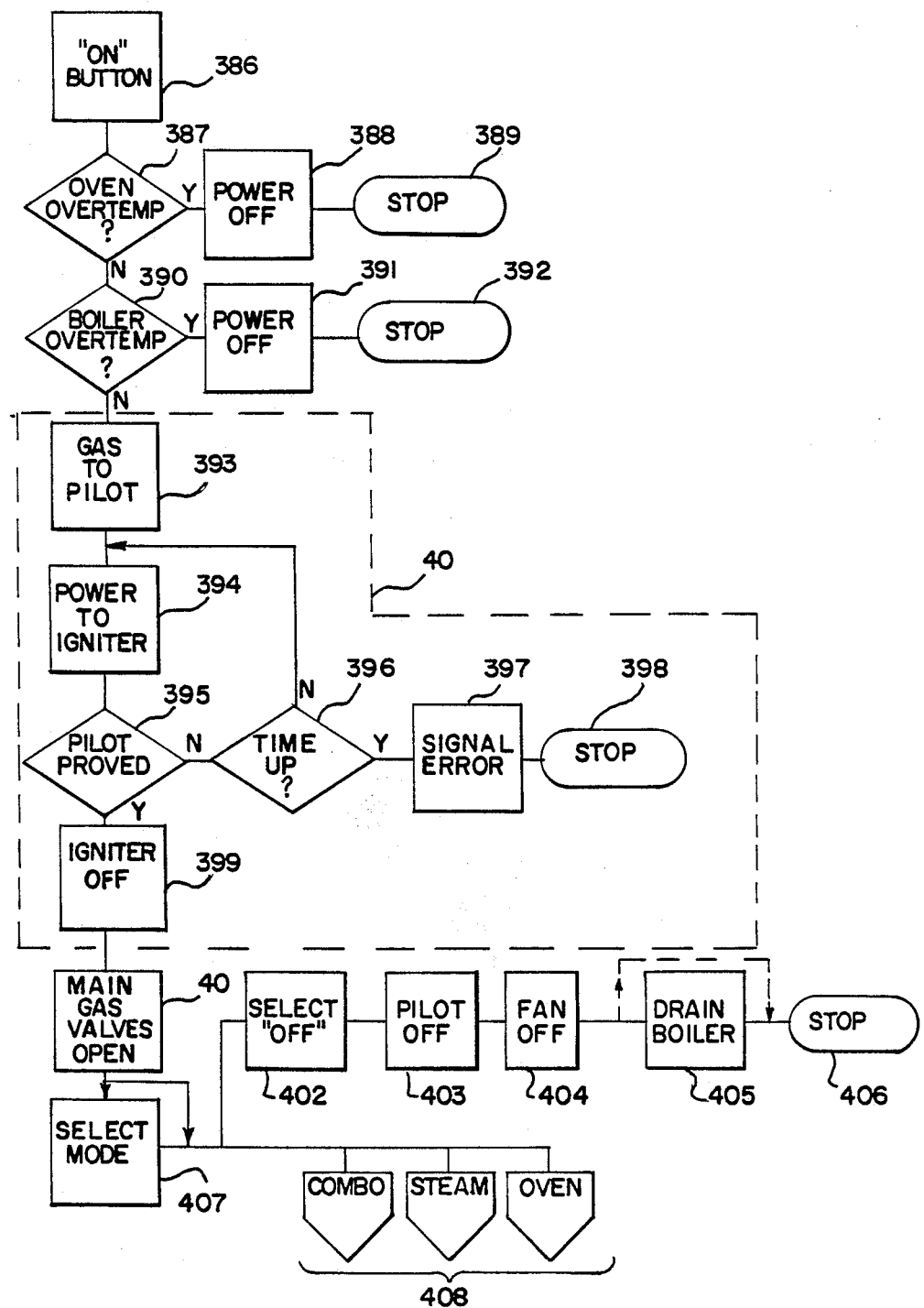
FIG. 16 is a flow chart of the power-up sequence of the combination oven of FIG. 1.

FIG. 16 is a flow chart of the power-up sequence of the oven 20 when the on-off switch 326 is pressed. The flow chart of FIG. 16 illustrates functions that may be performed in software, hardware, or both. In FIG. 16, a block 386 indicates operation of the on-off switch 326. Decision block 387 then tests to see if the oven overtemperature sensor has been actuated. If it is, block 388 calls for turning the power off and interrupt symbol 389 indicates a stop. If the oven overtemperature sensor is not actuated, a decision block 390 tests to see if the boiler is over its limit temperature. If it is, a block 391 cuts power off and interrupt symbol 392 indicates that the oven operation is stopped. Either the decision block 387 or the decision block 390 could be handled in software, but in the preferred embodiment, they represented mechanical switches placed in the oven that interrupted power to the control circuits.

If the decision block 390 does not indicate a boiler overtemperature, then a block 393 calls for gas to the pilot light 178. The block 394 then immediately calls for power to the igniter 180, to ignite the pilot light 178. A decision block 395 tests to see whether the pilot light 178 is proved. This typically represents a signal from a thermocouple or flame rectifier (sensor bulb 182) in the pilot flame that indicates that the pilot light 178 is burning. If the pilot light 178 is not proved, the decision block 396 tests to see whether the ignition time is up. This is a period typically of the order of 10 to 30 seconds, allowed for the pilot light 178 to prove. If the time is up, an interrupt symbol 398 stops the operation of the oven 20, which will stop the flow of gas to the pilot light 178 and power to the igniter 180 automatically. If the time is not up, then the decision block 396 loops to the block 394 and the ignition process continues.

When the pilot light 178 is proved, a block 399 turns off the igniter 180 and a block 400 opens the gas control valve 174. While the functions in the blocks 393 through 399 could be performed in software, they also typically represent the function of commercial gas control valve systems such as the Honeywell Model Y86G, and can be performed by such systems. During subsequent operation, if at any time the pilot flame sensor bulb 182 fails to recognize a flame at the pilot light 178, the gas control valve 174 is shut, and the sequence beginning with block 393 is repeated.

When control has proceeded through the block 400, the oven 20 is said to be in "no mode" unless a mode has been selected. If a mode has not been selected, a block 407 calls for selecting a mode. If one was selected when the on-off switch 326 was pressed, the block 407 is bypassed. In either case, turning off the oven 20 comprises selecting the "off" position of the on-off switch 326 in a block 402. A block 403 then turns off gas to the pilot light 178, a block 404 turns off the fan, a block 405 calls for draining the boiler if this is desired, and an interrupt symbol 406 calls for a stop of operation. In the alternative, the boiler may be left full, in which case the block 405 is bypassed. If one of the cooking modes is selected, this comprises engaging a button to select one of the extension symbols 408. These modes will be described separately.

FIG. 17 is a flow chart of operation in the oven mode. In FIG. 17, a block 410 is engaged by selecting "oven" and setting a temperature by means of the (oven) select button 332 and the dial 44 of FIG. 10. A block 412 causes the fan 96 of FIG. 3 to turn on. A decision block 414 then tests whether the temperature is in range. If the temperature is not in range, a decision block 416 tests to see whether the temperature is low. If the temperature is low, a block 418 turns on the "wait" light 334 and a block 420 calls for oven heat. Operation continues with the gas on and the "wait" light 334 on. If the temperature is not in range and is not low, a decision block 422 tests to see if the temperature is high. If the temperature is neither low nor high, an error indication 424 switches control to a service routine. If the temperature is high, a block 426 switches the oven heat off and a block 428 calls for the "hot" light 338, which stays on until the temperature is no longer high. If the decision block 414 indicates that the temperature is in range, a block 430 switches off the solenoid valves controlling gas to the burners 86, and a block 432 calls for the "ready" light 336. These conditions will continue until the block 432 receives a power-off indication, in which case control exits to an off circle 434, or until the temperature drops to call for gas to the burners 66. The power-off switch 326 may be operated manually, or the "off" condition may be operated by timeout of the time display 46.

FIG. 18 is a flow chart of operation in the combination oven sequence. This is the mode in which steam is superheated when it is circulated past the fire tubes 66 by the fan 96. In FIG. 18, a block 440 indicates that the "combo" mode has been selected. This is done by pushing the "combo" button 330 and pressing the on-off switch 326. A block 442 calls for the fan 96 to run. A block 444 indicates that cooking time should be set, but this is not necessary. The "combo" mode comes to "ready" without setting a cooking time. A decision block 446 then tests the temperature of water in the boiler 112. If the temperature is less than a predetermined value, here indicated as 205° F., a block 448 calls for boiler heat to be at full power (all five burners 116) and a block 450 calls for a "wait" light 334. The predetermined temperature that affects the change of the decision block 446 may be set in the program by the programmer, based upon parameters such as the altitude at which the oven is to operate, or it may be determined adaptively within the oven as a predetermined number of degrees below the ambient boiling temperature. However the limit is set, when the decision block 446 determines that the boiler temperature has reached or exceeded the predetermined temperature, a block 452 reduces the boiler heat supply to the low-fire condition (only the bottom one of the burners 116). A decision block 454 then tests to see whether the inner chamber 52 is at the set temperature. If it is not, a block 456 tests to see whether it is over the set temperature. If it is not, a block 457 calls for high oven heat and a block 458 calls for the "wait" light 334. This condition continues until the decision block 454 determines that the inner chamber 52 is at the set temperature. In the alternative, if the temperature setting has been reduced for a hot oven, the decision blocks 454 and 456 will indicate that the inner chamber 52 is over the set temperature. In this case, a block 460 will turn off the oven heat and a block 462 will light the "hot" light 338.

One or the other of the two loops just described will continue until the inner chamber 52 reaches its set temperature, at which time control exits from the decision block 454 to a block 464. This turns the oven gas burners 66 off. A block 466 lights the "ready" light 336. If cooking time has not been set at the block 444, the inner chamber 52 will maintain the preset temperature by looping in the control blocks just described. This is either a waiting mode, awaiting the insertion of food into the oven, or it is a cooking mode. The combo mode can be used without using the timer. If it is desired to use the timer, then a block 468 starts the timer countdown. This is engaged by setting a time on the timer 46, if a time has not been set, and by pushing the "start" button 320. A decision block 470 then tests whether the time has timed out. If it has not, control returns to the cooking cycle. If the timer 46 has timed out, a decision block 472 tests whether the "hold" is set by dial 342. If it is, control passes through a block 473 to the "hold" mode. If "hold" is not set, or if the oven does not include the "hold" option, the decision block 472 passes control to a block 474, which turns off the gas to the burners 66 and also turns off the blower. A block 476 sounds a buzzer for a predetermined time interval, and a stop circle 478 indicates that the oven has stopped its cooking cycle. The temperature control described here has referred to the temperature of the inner chamber 52. Temperature may be sensed either in the inner chamber 52 or in the outer chamber 53, as the circulation of air or steam by the fan 96 is typically great enough to keep the temperature of air or steam in the inner chamber 52 substantially equal to that in the outer chamber 53.

FIG. 19 is a flow chart of operation in the steam mode. When steam is selected, as indicated by a selection block 480, a block 482 calls for the blower 82 to operate. A block 484 calls for the setting of a cooking time, and a decision block 486 tests to see if boiler temperature is at the boiling temperature. If it is not, a block 488 calls for boiler heat to be on full, with gas delivered to all five burners 116, and a block 390 lights the "wait" light 334. This continues until the decision block 486 indicates that the boiler temperature is up. A block 494 then calls for a "ready" light 336. A decision block 496 tests to see if the "start" button 320 has been pressed. If it has not, operation cycles in a "ready" mode. If "start" is engaged, a decision block 498 tests to see if the door 22 is closed. If it is not, a block 500 assures that the fan 96 is off, and a block 502 interrupts the supply of gas to the boiler burners 116. If the door 22 is closed, a block 504 calls for operation of the fan 96, and a block 506 starts the timer. A decision block 508 tests whether the timer has timed out. If it has not, the steam cycle continues. If the timer has timed out, a block 510 turns off the fan 96 and the gas to the burner or burners 116. A block 512 calls for the buzzer to sound for a predetermined time, and a stop circle 514 indicates that the cooking operation is ended. The steam mode is operated so as to require the use of a timer, in contrast to the oven and combo modes, which operate with or without setting the time display 46. This is a matter of design choice.

FIG. 20 is a flow chart of operation in the hold or proof mode. In FIG. 20, a selection block 520 indicates that hold or proof has been selected by the dial 342. This entry may be made as a result of timing out from the use of one of the oven modes, or it may be entered directly. Direct entry is the usual way for using the oven to proof dough. It may also be desirable to cook under conditions of controlled humidity or at the lower temperature available in the hold or proof mode. In any event, when the hold or proof mode is entered, as indicated by the selection block 520, a block 522 checks to see that the fan 96 is on, and a block 524 checks to see that the hold temperature has been set by the dial 342, while a block 526 checks to see that hold time is set. A decision block 528 then tests to see if a humidity setting has been made by the dial 346. If a humidity setting is made, a block 530 calls for a reading of boiler temperature, and a block 532 calls for the oven temperature. These are essentially wet- and dry- bulb readings which can be taken to a look-up table in ROM 368 or EE-PROM 372 or the like, from which a block 534 calculates the humidity in the oven. A decision block 536 tests whether the humidity is within limits. If it is not, a decision block 538 tests to see if the humidity is high. If it is, this means that the boiler temperature is too high and a block 540 calls for blowdown. This represents opening the solenoid valve 100 and admitting cold water until the boiler temperature is at a proper value. If the humidity is not in limits and is not high, the block 532 selects low boiler heat, only one burner 116. When the decision block 536 indicates that the humidity is in limits, a block 544 calls for the boiler heat to be turned off. Control then passes to a decision block 546, which tests to see if the oven temperature is in limits. If it is, and if a decision block 548 indicates that the hold timer is running, then a block 550 calls for oven gas to be turned off and the control cycle repeats. If the hold timer times out, control passes to an off circle 552, and the oven is turned off. If the decision block 546 receives an indication that the oven temperature is out of limits, a decision block 554 tests to see if the temperature of the inner chamber 52 is high. If it is, a block 556 calls for the gas to be turned off, and control is in this mode until the temperature of the inner chamber 52 again comes within limits. If the temperature of the inner chamber 52 is out of limits and is not high, then the decision block 554 passes control to a block 558, which calls for opening the solenoid valve 186 of FIG. 8 to heat the oven.

Figure 21:
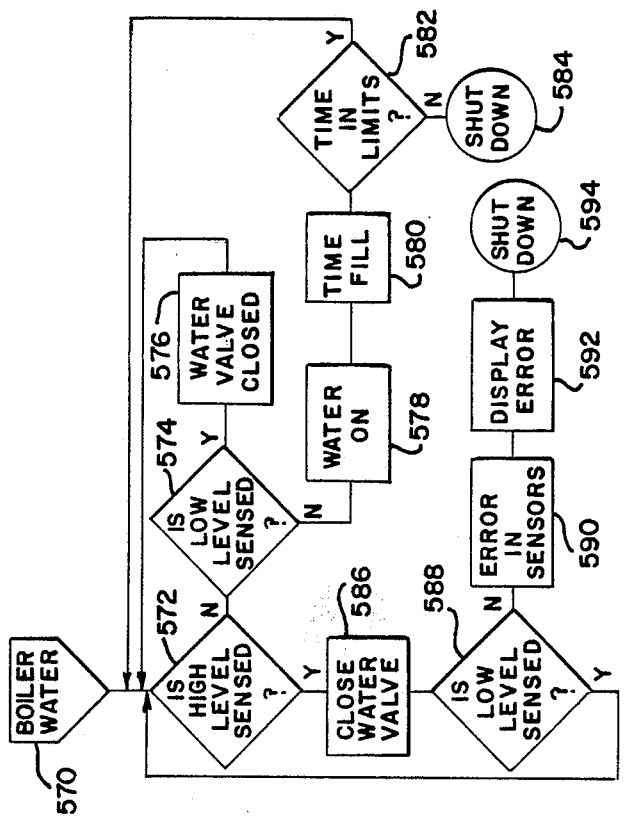
FIG. 21 is a flow chart illustrating control of boiler water level.

FIG. 21 is a flow chart showing the control of the water level in the boiler 112. A selection block 570 indicates that steam is called for in cooking. This means that the combo oven is either in the combo or steam mode. If the combo oven is operated in the oven mode, steam is not called for, and the boiler 112 may stay full and unheated or may be empty with the pinch valve 160 open. The flow of water into the boiler 112 is called for by operation of a decision block 572 which tests whether high water level is sensed in the boiler 112. If it is not, a decision block 574 tests to see whether a low water level is sensed in the boiler 112. If it is, a block 576 orders the solenoid valve 100 opened. If the low level is not sensed, a block 578 calls for the water to be turned off in the boiler 112. A block 580 times the fill, as the boiler 112 is allowed a set time to fill. If the time is out of limits, a decision block 582 calls for a shutdown circle 584, the oven is shut down, and an error message may be generated. If the time of fill is within limits, control returns to the decision block 572. If the high level is sensed, a block 586 directs that the water valve be closed. A decision block 588 then tests whether the low level is sensed. If the low level is not sensed by the decision block 588 when the high level is sensed by the decision block 572, then a block 590 detects that there is an error in the sensors. One or more of the sensors may have failed. A block 592 directs the display of an error signal, and a shutdown signal 594 shuts the oven down. If the low level is sensed in the decision block 588, control returns to the decision block 572, and the cycle continues.

Figure 22:
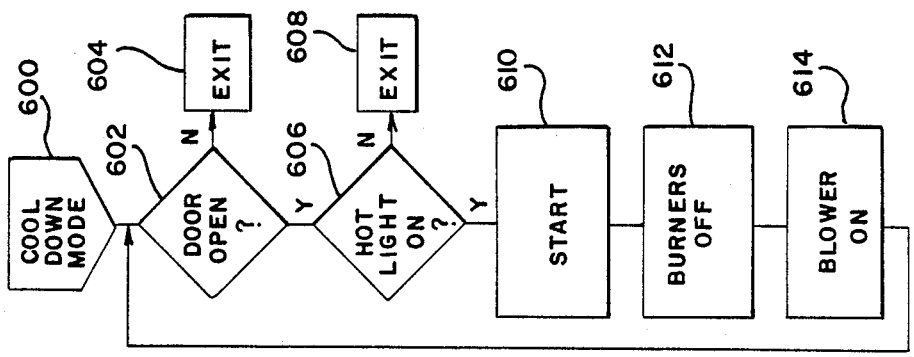
FIG. 22 is a flow chart of operation of the cool-down mode for the combination oven.

FIG. 22 is a flow chart showing the operation of the cooldown mode for the combination oven. In FIG. 22, a selection block 600 indicates that the cooldown mode has been activated. This is done when one of the modes steam, combo, or oven has been selected. A decision block 602 tests whether the door 22 is open. If it is not, the cooldown mode has not been selected, and a block 604 directs exit. If the door 22 is open, a decision block 606 tests whether the "hot" light 338 is on. This is an indication that the temperature setting has been changed to a lower value, calling for oven cooldown. If the "hot" light 338 is not on, a block 608 directs exit from the cooldown mode. If the "hot" light 338 is on, a block 610 tests to see if the "start" button 320 has been depressed. Depressing the "start" button in a hot oven with the door 22 open causes a block 612 to turn the heater off and a block 614 to run the fan 96. This speeds the cooldown process which continues as long as the inner chamber 52 is above the new set temperature. When the inner chamber 52 is cooled to the new set temperature, the decision block 606 directs control to the block 608, which exits from the cooldown mode.

The combination oven 20 of the present invention operates in response to manual inputs and also to inputs from various sensors. These inputs are coupled to the microprocessor where they are processed to control a number of quantities and also to produce display information. Table 1 is a list of the parameters sensed in combination oven 20.

TABLE 1
Parameters Sensed in Combination Oven 20

Temperature in the Inner Chamber 52
Water High Level in the Boiler 112
Water Low Level in the Boiler 112
Water Temperature in the Boiler 112
Overtemperature in the Inner Chamber 52
Overtemperature in the Boiler 112
Temperature of Liquid in the Drain Line 154
Pilot Light On Table 2 is a list of the switches and controls, both manually and automatically operated, that provide inputs to control combination oven 20. It should be noted that the combination oven 20 can be operated without the proof and hold feature. If this is done, certain of the features of Tables 2, 3 and 4 will not be needed.

TABLE 2
Switches and Controls in Combination Oven 20

On-Off
Mode: Steam, Combination, Oven, No Mode
Oven Temperature
Time
Holding Temperature
Holding Humidity
Start
Clear
Door Open
Pilot Proved Table 3 is a list of the quantities and elements controlled by the microprocessor of the present invention in response to the inputs from the sensed parameters of Table 1 and the switches and controls of Table 2. The microprocessor used was an Intel 8031.

TABLE 3
Items Controlled in the Combination Oven 20

Water Level in the Boiler 112
Water Temperature in the Boiler 112
Air or Steam Temperature in the Inner Chamber 52
Humidity in the Inner Chamber 52
Gas flow to the Boiler Burners 116
Gas flow to the Oven Chamber Burners 86
Overtemperature in the Oven Chamber 52
Boiler Blowdown
Time to Fill Boiler
Over Temperature
Cooking Time
Holding Temperature
Drain Valve
Condensate Spray
Gas Flow to the Pilot The microprocessor of the present invention controls various displays to assist an operator of the combination oven 20. Table 4 is a list of those displays.

TABLE 4
Displays in Combination Oven 20

Cooking Time Remaining
Service Needed
Hot
Ready
Wait
Steam
Pilot
Combo
Oven

TABLE 4-continued
Displays in Combination Oven 20

On-Off
Cooking Temperature
Holding Temperature
Humidity
Alert Buzzer (cooking timeout)
Colon Flash (timer running)

The description of specific embodiments of the present invention is intended to set forth the best mode known to the inventors for the practice of their invention. It should be taken as illustrative and not as limiting, and the scope of the invention should be limited only by the appended claims.

What is claimed is:

1. A combination cooking oven that is heated by gas comprising:
an enclosure;
an oven inner chamber in said enclosure that is substantially a rectangular parallelpiped defined by a top plate, a bottom plate, a side wall that includes a plurality of apertures, a fan shroud, a rear wall and a front wall that includes a door, the shroud spaced from the enclosure to form a plenum, the top plate, bottom plate and side wall spaced from the enclosure to form with the rear wall and the front wall a heat-exchange region;
a plurality of fire tubes disposed in the heat-exchange region;
a plurality of gas burners disposed to heat the fire tubes by passing hot combustion products through the fire tubes, and a second and third gas burner heating another of said serpentine compartments:
a fan disposed in the shroud to circulate gases and vapors through the oven inner chamber, the heat-exchange region and back to the oven inner chamber through the apertures in the side wall;
means for supplying steam to the oven inner chamber comprising a boiler having a plurality of gas burners disposed to send hot combustion products through a vertical array of serpentine channels in a fire tube within a chamber having a water inlet and a steam outlet, wherein at least one channel is heated by two burners;
mean for sensing temperatures in the oven inner chamber and in the means for supplying steam; and
means responsive to the means for sensing temperatures for controlling the oven in heated air, steam and combination cooking modes.

2. The combination cooking oven of claim 1 wherein the plenum, top plate, bottom plate and side plate are removable without the use of tools 3. The combination cooking oven of claim 1 wherein the means for supplying steam further comprises:
means for draining the boiler.

4. The combination cooking oven of claim 3 wherein the boiler fire tube is a double-pass fire tube.

5. The combination cooking oven of claim 1 wherein the means for controlling the oven comprises a microprocessor coupled to the means for sensing temperature, the microprocessor adapted to receive control inputs and produce output signals to control operation of the oven.

6. The combination cooking oven of claim 5 consisting in addition:
means for sensing a level of water in the boiler;

means for connecting the means for sensing to the microprocessor; and means connected to the microprocessor for controlling the level of water in the boiler according to predetermined criteria.

7. The combination cooking oven of claim 1 wherein the side wall is disposed parallel to and opposite the fan shroud so that air flow in the oven inner chamber is substantially unidirectional from the fan to and through the side wall.

8. The combination cooking oven of claim 1 wherein the side wall is disposed parallel to and opposite the fan shroud so that air flow in the oven inner chamber is substantially unidirectional from the side wall to the fan.

9. The combination cooking oven of claim 1 wherein the apertures are distributed uniformly in the side wall.

10. The combination cooking oven of claim 1 wherein the apertures are distributed in the side wall in a predetermined pattern to direct air flow in the inner chamber in substantially uniform flow.

11. The combination cooking oven of claim 1 wherein the fire tubes are vented to the atmosphere without passing combustion products through the oven inner chamber.

12. A boiler for producing steam for cooking food comprising:

a plurality of gas burners;

means for igniting gas to produce hot combustion products;

a plurality of serpentine channels in a fire tube and disposed in a boiler chamber;

at least one channel heated by one gas burner, and a plurality of channel each heated by two gas burners;

means for admitting water to the boiler chamber in a heat-exchange relationship with the boiler fire tube to heat the water and produce steam within the boiler chamber; and means for conveying the steam from the boiler chamber to the oven.

13. The boiler of claim 12 comprising in addition means for sensing temperature of the water; and means for controlling a flow of gas to the burner in response to the sensed temperature to maintain a predetermined temperature.

14. The boiler of claim 12 wherein the gas burners are in a stacked vertical array.

15. The boiler of claim 14 wherein the boiler has a smallest dimension that is horizontal.

16. A gas-heated cooking oven comprising:
an enclosure;
an oven inner chamber that is substantially a rectangular parallelpiped defined by a top plate, a bottom plate, a side wall that includes a plurality of apertures, a fan shroud, a rear wall and a front wall that includes a door, the shroud spaced from the enclosure to form a plenum, the top plate, bottom plate and side wall spaced from the enclosure to form a heat-exchange region with the rear wall and the front wall;

a plurality of fire tubes disposed substantially parallel to each other in the heat-exchange region;

a plurality of gas burners disposed to heat the fire tubes by natural draft by passing hot combustion products through the fire tubes;

a fan disposed in the shroud to circulate gases and vapors through the oven inner chamber, the heat-exchange region and back to the oven inner chamber through the apertures in the side wall, the circulation producing partially concurrent and partially countercurrent heat exchange;

a boiler having a double-pass fire tube that passes combustion products in a serpentine arrangement of two passes;

a gas burner disposed to heat the boiler fire tube by natural draft;

means for admitting water to the boiler;

means for draining the boiler; and means coupled to the oven inner chamber for conveying steam to the oven inner chamber.

17. A gas-heated cooking oven comprising:

an inner chamber for cooling food; and outer chamber encompassing top bottom, and sides of the inner chamber and forming therebetween a heat exchange region;

a plurality of fire tubes disposed substantially parallel to each other within the adjacent the bottom, a side, and top of the inner chamber and exhausting to the atmosphere;

a plurality of gas burners for heating the fire tubes by natural draft by passing hot combustion products through the fire tubes and exhausting the combustion products to the atmosphere;

a fan disposed adjacent a side opposite the side which the tubes are adjacent the tubes are adjacent so as to circulate gases and vapors through the oven inner chamber, the heat-exchange region and back to the oven inner chamber through apertures in side wall, the circulation producing partially concurrent and partially countercurrent heat exchange;

means for supplying superheated steam to the oven inner chamber;

means for sensing temperatures in the oven inner chamber and in the means for supplying superheated steam; and means responsive to the means for sensing temperatures for controlling the oven in each of the heated air, steam, and combination cooking modes.

* * * * *

UNITED STATES PATENT AND TRADEMARK OFFICE
CERTIFICATE OF CORRECTION

PATENT NO. : 4,817,582

DATED : April 4, 1989

INVENTOR(S) : G. Robert Oslin
Stuart C. Jepson

It is certified that error appears in the above-identified patent and that said Letters Patent is hereby corrected as shown below:

Column 1, line 37, "convention" should be --convection--.

Column 8, line 7, "started" should be --stacked--.

Column 8, line 39, "Which" should be --which--.

Column 18, lines 34-35, ", and a second and third gas burner heating another of said serpentine compartments:" should be deleted, and a semicolon (;) inserted to follow the word "tubes" in line 34.

Column 19, line 33, "channel" should be --channels--.

Column 20, line 27, "cooling" should be --cooking--; and the word "and" should be --an--.

Column 20, line 28, a comma (,) should appear after the word "top".

Column 20, line 32, "the" (first usage) should be --and--.

Column 20, line 40, the first four words "the tubes are adjacent" should be deleted as being duplicative.

Signed and Sealed this

Twenty-ninth Day of May, 1990

*Attest:*

HARRY F. MANBECK, JR.

*Attesting Officer*  *Commissioner of Patents and Trademarks*